United States Patent
Lee et al.

(10) Patent No.: US 7,167,414 B2
(45) Date of Patent: Jan. 23, 2007

(54) AMPLITUDE PRESERVING PRESTACK MIGRATION METHOD

(75) Inventors: Seongbok Lee, Houston, TX (US); David Graham King, Epsom (GB)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/958,522

(22) Filed: Oct. 4, 2004

(65) Prior Publication Data

US 2006/0072373 A1   Apr. 6, 2006

(51) Int. Cl.
*G01V 1/28* (2006.01)
*G01V 1/36* (2006.01)

(52) U.S. Cl. .................. 367/51; 367/47; 367/50; 367/52

(58) Field of Classification Search ............ 367/25, 367/46, 47, 38, 50, 75, 51–53; 702/14
See application file for complete search history.

(56) References Cited

U.S. PATENT DOCUMENTS

| | | | | |
|---|---|---|---|---|
| 5,987,387 | A * | 11/1999 | Dickens et al. | 702/14 |
| 5,999,488 | A * | 12/1999 | Smith | 367/50 |
| 6,691,075 | B1 * | 2/2004 | Winbow et al. | 703/2 |
| 6,807,489 | B2 * | 10/2004 | Naville et al. | 702/17 |
| 6,826,484 | B2 * | 11/2004 | Martinez et al. | 702/14 |
| 6,864,890 | B2 * | 3/2005 | Meek et al. | 345/440 |
| 2004/0093163 | A1 * | 5/2004 | Reshef et al. | 702/14 |
| 2004/0117123 | A1 * | 6/2004 | Jing | 702/16 |
| 2005/0088913 | A1 * | 4/2005 | Lecomte | 367/51 |
| 2005/0219949 | A1 * | 10/2005 | Taner et al. | 367/57 |

OTHER PUBLICATIONS

Sun, et al. "On the computation of the true-amplitude weighting functions." Geophysics, Sep.-Oct. 1998.*
Vanelle, et al. "True-amplitude migration wights from traveltimes." EAGE meeting, 2000.*
Gajewski, et al. "Amplitude preserving Kirchhoff migration: A traveltime based strategy." Studia geophysica et geodaetica, 2002.*
Coman, et al. "3D traveltime and migration weight computation using wavefront oriented ray tracing." EAGE Jun. 2001.*
Zhang, et al. "Amplitude preserving v(Z) prestack Kirchhoff migration, Demigration and modelling." EAGE 2002.*
Biondi, et al. "Amplitude preserving prestack imaging of irregularly sampled 3-D data." SEG 2002.*
Geiger. "Amplitude preserving weights for Kirchhoff prestack time migration." CSEG Conferences, Jun. 2003.*
Tygel, et al. "2.5-D true-amplitude Kirchhoff migration to zero offset in laterally inhomogeneous media." Geophysics, Mar.-Apr. 1998.*

(Continued)

*Primary Examiner*—Jack Keith
*Assistant Examiner*—Scott A. Hughes
(74) *Attorney, Agent, or Firm*—E. Eugene Thigpen; Richard A. Fagin

(57) ABSTRACT

A method is disclosed for amplitude preserving Kirchhoff time migration. The method includes calculating estimates of the geometrical spreading terms using a constant velocity approximation. Takeoff and emergence angles are accurately calculated based on a model of velocity which varies with respect to travel time. An image can be calculated at at least one travel time using the estimated weights and calculated takeoff and emergence angles.

11 Claims, 4 Drawing Sheets

OTHER PUBLICATIONS

Sun, et al. Amplitude preserving V(z) pre-stack Kirchhoff time migration for VTI media. First Break, vol. 19. Nov. 11, 2001.*
Zhang, et al. "True amplitude migration using common-shot one-way wavefield extrapolation." CSEG Conference, Jun. 3, 2003.*
Dellinger, et al. "Efficient two and one-half dimensional true-amplitude migration."*
Peles, et al. "A practical approach to amplitude preserving migration." 2002.*
Vanelle, et al. "True-amplitude migration—the traveltime-based strategy."*
Sun, at al. "Computation of the 3-D true amplitude weighting functions in migration without dynamic ray tracing/" (abstract only). SEG Int'l Meeting, 1996.*
Hubral, et al. "Geometrical-spreading and ray-caustic decomposition of elementary seismic waves." Geophysics, Jul.-Aug. 1995.*
Dellinger, et al. "Efficient two and one-half dimensional true-amplitude migration." CSEG National Convention, May 1999.*
Vanelle, et al. "Determining Geometrical spreading from traveltimes in anisotropic media." 72$^{nd}$ Annual SEG Int'l Mtg. Oct. 2002.*

Chuanwen Sun, Ruben D. Martinez, "Amplitude preserving 3D pre-stack Krichhoff time migration for V(z) and VTI media", 72$^{nd}$ Annual International Meeting, Society of Exploration Geophysicists, Expanded Abstracts, 2002, pp. 1224-1227.
Jörg Schleicher, Martin Tygel, Petter Hubral, "3-D true-amplitude finite-offset migration", Geophysics, 1993, pp. 1112-1126, vol. 58, No, 8.
N. Bleistein, J.K. Cohen, J.W. Stockwell, Jr., "Mathematics of Multidimensional Seismic Imaging, Migration, and Inversion", Springer, 2001, Chapter 5, pp. 216-281 and Chapter 6, pp. 282-309.
Yu Zhang, Sun Gray, Jerry Young, "Extract and approximate weights for Kirchhoff migration", 70$^{th}$ Annual International Meeting, Society of Exploration Geophysicists, Expanded Abstracts, 2000, pp. 1036-1039.
Joe A. Dellinger, Samuel H. Gray, Gary E. Murphy, John T. Etgen, "Efficient 2.5-D true-amplitude migration", Geophysics, 2000, pp. 943-950, vol. 65, No. 3.

* cited by examiner

AMPLITUDE PRESERVING PRESTACK MIGRATION METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic surveying of subsurface Earth formations. More specifically, the invention relates to methods for prestack migration of seismic data in which amplitudes of events in the seismic data are substantially preserved.

2. Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the earth's surface, and deploying a seismic energy source or an array of such sources also at or near the surface. The seismic energy source is actuated and seismic energy emanates from the source, traveling generally downwardly through the subsurface until it reaches one or more acoustic impedance boundaries in the subsurface. Seismic energy is reflected from the one or more impedance boundaries, where it then travels upwardly until being detected by one or more of the sensors. Structure and composition of the Earth's subsurface is inferred from, among other properties of the detected energy, the travel time of the seismic energy, and the amplitude and phase of the various frequency components of the seismic energy with respect to the energy emanating from the seismic source.

In order to infer the structures of subsurface earth formations from seismic travel times measured at or near the earth's surface from a source position at or near the surface, it is necessary to determine the velocity of the various formations through which the seismic energy passes. Velocities of the earth formations can vary both with respect to depth in the earth (vertically), and with respect to geographic position (laterally). Seismic data, however, are recorded only with respect to time. Methods known in the art for estimating velocities of the earth formations both vertically and laterally rely on inferences about the travel path geometry of the seismic energy as it travels from the seismic source to the various seismic receivers deployed at the earth's surface.

In order for images produced from seismic data to correspond accurately to the spatial distribution of subsurface structures and compositional changes in the Earth's subsurface, techniques known generally as "time migration" and "depth migration" are performed on the seismic data. Migration is a process by which reflection events in seismic data are made to correspond to their true spatial position. Time migration positions the reflective events in time and does not correct for all effects of lateral velocity gradients. Depth migration attempts to place reflective events at their true depth positions within the Earth's subsurface.

There are generally two classes of time migration techniques. One type of time migration is known as prestack time migration and disclosed, for example, in, Sun, C., Martinez, R., *Amplitude preserving 3D pre-stack Kirchhoff time migration for V(z) and VTI media*, 72nd Annual International Meeting, Society of Exploration Geophysicists, Expanded Abstracts, pp. 1224–1227 (2002). Pre-stack migration is performed on individual seismic data recordings ("traces") and can be computationally expensive.

The other type of time migration is called post stack migration, which represents migration techniques that are performed on seismic data for which numbers of individual data recordings are summed ("stacked") to improve signal to noise ratio. Prestack migration typically produces better images, although it is computationally more expensive than post-stack migration.

The prestack time migration method disclosed in the Sun et al. paper mentioned above is one of a type known as "amplitude preserving", meaning that the amplitudes of events in the seismic data are substantially preserved during the migration procedure. Amplitude preserving migration provides, among other benefits, greater accuracy in processing techniques known as "amplitude versus offset" (AVO). A principal objective of amplitude preserving migration techniques is to make the reflection amplitudes proportional to the reflectivity at the various subsurface boundaries. Amplitude preserving migration is thus characterized by recovering amplitude loss in reflected seismic energy caused by geometric spreading of the seismic energy during propagation through the Earth, so that the amplitudes at least to some extent correspond to the reflectivity of the various subsurface boundaries.

A prestack migrated image is calculated by mapping contributing data samples of an input seismic data trace to a target sample of an image trace, subject to the constraint that the contributing data sample time (indexed to actuation of the seismic source) is the same as the travel time of seismic energy from the seismic source to the receiver via the image point. The contributing data samples from all the input seismic data traces are then summed. A so-called "true amplitude" migration, which recovers the reflection amplitude loss caused by geometric spreading so that the amplitudes correspond to the reflectivity of subsurface reflectors, is achieved by a weighted, rather than a simple summation of the input data samples. That is, the amplitude of the contributing data sample represents the sum of the input data samples multiplied by a weighting factor. The weighting factor is a function of a number of different variables, including the travel time, and the locations of the source and receiver corresponding to each data sample trace (called the "acquisition geometry"). There are several different techniques for determining "true amplitude" weight function known in the art. See, for example, Schleicher, J., Tygel, M., and Hubral, P., 1993, *3-D true amplitude finite-offset migration*; Geophysics, 58, 1112–1126, or Bleistein, N., Cohen, J. K., Stockwell, J. W., *Mathematics of multidimensional seismic imaging, migration, and inversion*, Springer, 2001. The true amplitude weight functions for the most common seismic data acquisition geometries, such as common-shot or common-offset geometry, contain terms which include square roots of the cosine of the takeoff and emergence angles, and in-plane and out-of-plane spreading terms for every possible combination of source, receiver, and image point, even for the relatively simple case of a v(z) medium. See, for example, Zhang, Y., Gray, S., Young, J., *Exact and approximate weights for Kirchhoff migration*, 70$^{th}$ Annual Internat. Mtg., Soc. Expl. Geophys. Expanded Abstracts, 1036–1039 (2000). Because the generation of the weights is very computationally demanding and the weights must be stored and interpolated during migration, the computation of the weight function can dominate the total computation cost of the migration process.

It is known in the art to approximate the weight function in various ways so as to avoid increased input/output and computational expense. See, for example, Dellinger, J. A., Gray, S. H., Murphy, G. E., and Etgen, J. T., *Efficient 2.5-D true-amplitude migration*; Geophysics, 65, 943–950 (2000). Typically such estimates are made using a constant velocity approximation for the Earth formations. However, it has been determined that weight functions estimated using the constant velocity approximation frequently do not provide satisfactory results for processing called "amplitude versus offset" ("AVO") in v(z) (velocity varies with depth) media. There exists a need for a prestack migration technique that provides amplitude quality similar to those provided by "exact" true-amplitude techniques known in the art, yet does not require significant increase of computational expense.

SUMMARY OF INVENTION

One aspect of the invention is a method for amplitude preserving Kirchhoff time migration. A method according to this aspect of the invention includes calculating the geometrical spreading terms using a constant velocity approximation while computing takeoff and emergence angles accurately based on a model of velocity which varies with respect to travel time.

Another aspect of the invention is a computer program stored in a computer readable medium. The program includes logic operable to cause a programmable computer to perform steps including calculating the geometrical spreading terms using a constant velocity approximation while computing takeoff and emergence angles accurately based on a model of velocity which varies with respect to travel time.

Other aspects and advantages of the invention will be apparent from the following description and the appended claims.

DETAILED DESCRIPTION

Figure 1:
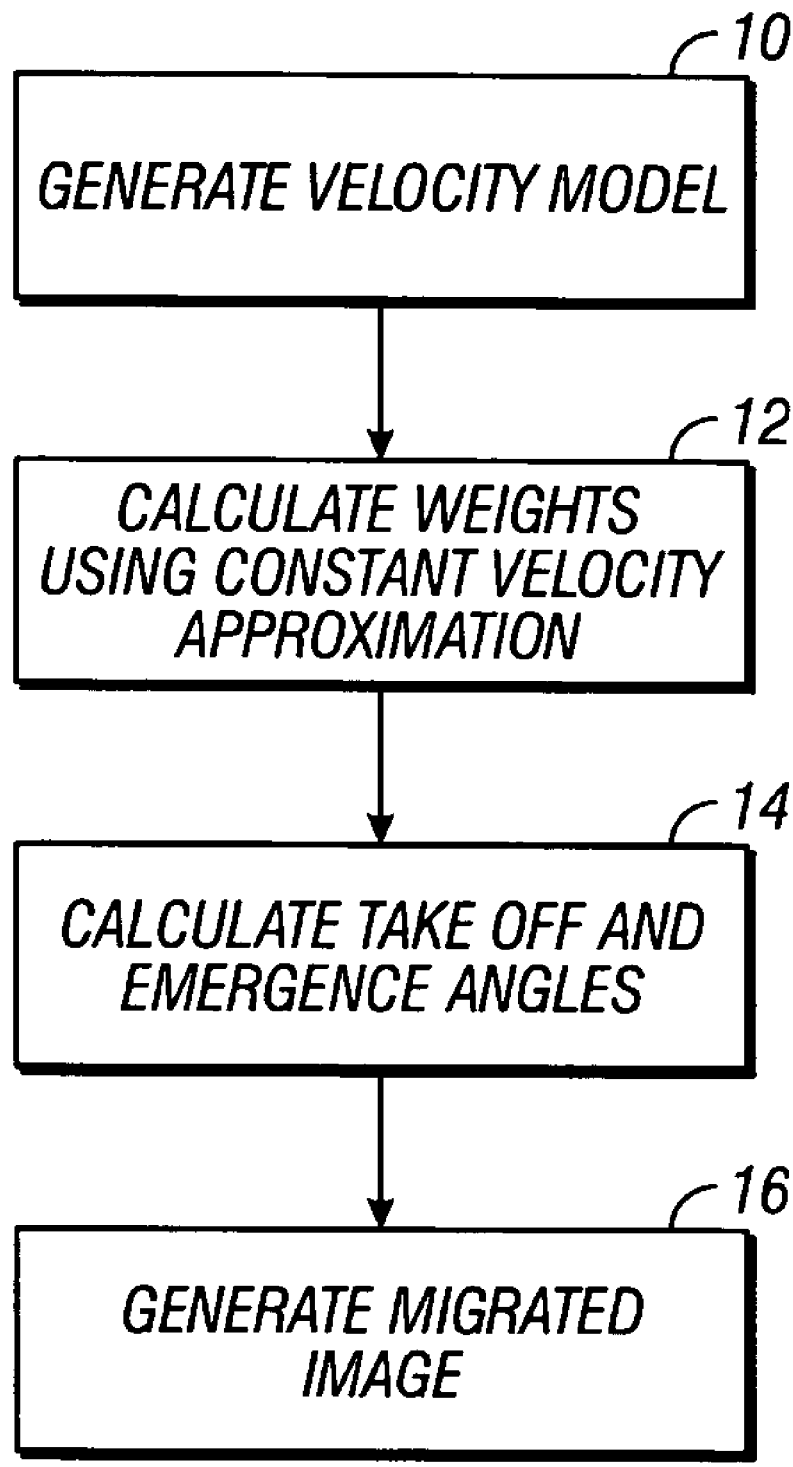
FIG. 1 shows a flow chart of an example embodiment of a method according to the invention.

Methods according to the invention may be better understood in the context of Kirchhoff prestack time migration. Kirchhoff prestack time migration is based on the Kirchhoff boundary integral solution to the scalar wave equation. The Kirchhoff boundary integral solution is a mathematical statement of Huygens' principle. The Huygens' principle states that a wavefield, at any interior point in a volume, can be reconstructed by a surface integration of the boundary values of the wavefield, weighted by the Green's function impulse response to the wave operator.

Kirchhoff prestack time migration may be expressed mathematically using shot (seismic source) positions denoted by $(x_s, y_s)$, seismic receiver positions denoted by $(x_r, y_r)$, and image point positions in time and space denoted by $(T_i, x_i, y_i)$ according to the expression:

$$I(T_i,x_i,y_i) = \int W(x_i,y_i,T_i,x_s,y_s,x_r,y_r) D(x_s,y_s,x_r,y_r,T_s+T_r) dx_s dx_r dy_s dy_r \quad (1)$$

in which $I(T_i, x_i, y_i)$ represents the image (amplitude) at equivalent surface (geographic) positions denoted by $(x_i, y_i)$, $T_i$ represents the image time, $W(x_i, y_i, T_i, x_s, y_s, x_r, y_r)$ is a weighting function, $D(x_s, y_s, x_r, y_r, T_s+T_r)$ represents the time derivative of the input (seismic trace) data, and $T_{tot} = T_s + T_r$ is the total travel time of seismic energy traveling from each source position $(x_s, y_s)$ to each seismic receiver position $(x_r, y_r)$ through the image point $(x_i, y_i)$. $T_r$ and $T_s$ represent, respectively, the seismic energy travel time from the image point to the receiver position and the travel time from source position to the image point. A preferred formula to calculate the travel time $T_{tot}$ for an image point for each source and receiver position, which may be used for both isotropic [v(z)] media and/or weak VTI (transversely isotropic with a vertical axis of symmetry) media is as follows:

$$T_{tot} = T_r + T_s + \Delta T(VTI) \quad (2)$$

$$= T_{r0}\left(1 + \frac{1}{2}CC\frac{C_4 x_r^6}{T_{r0}^2}\right) + T_{s0}\left(1 + \frac{1}{2}CC\frac{C_4 x_s^6}{T_{s0}^2}\right) + \Delta T(VTI)$$

in which CC is a constant, $x_s$ and $x_r$ represent the source and receiver offset i.e., the lateral distance between the source position and image position, and receiver position and image position, and $T_{r0}$ and $T_{s0}$ represent, respectively, the one way travel times containing up to forth order term of offset between the image point and the receiver and the image point and the source, respectively. Calculation of the above parameters from equations (1) and (2) is described in Sun, C., Martinez, R., *Amplitude preserving 3D pre-stack Kirchhoff time migration for V(z) and VTI media*, 72nd Annual International Meeting, Society of Exploration Geophysicists, Expanded Abstracts, pp. 1224–1227 (2002). ΔT(VTI) in equation (2) represents a difference in travel time between a "straight ray" (seismic energy traveling along a straight ray path from source to image point and image point to receiver point) and a "bending ray" (seismic energy traveling along a bending path due to refraction resulting from velocity variation in the subsurface) where the media are VTI. The quantity ΔT(VTI) can be calculated, as explained in the Sun and Martinez publication, by the expression:

$$\Delta T(VTI) = \frac{C(VTI) x_s^4}{2\sqrt{T_0^2 + \frac{x_s^2}{V_{rms}^2}}} + \frac{C(VTI) x_r^4}{2\sqrt{T_0^2 + \frac{x_r^2}{V_{rms}^2}}} \quad (3)$$

in which the quantity C(VTI) is determinable by the expression:

$$C(VTI) = \frac{2\eta}{V_{rms}^2 [T_0^2 V_{rms}^2 + (1+2\eta) x^2]} \quad (4)$$

η in the above equation represents the anisotropy parameter.

As explained in the Background section herein, calculating the weight factors for amplitude preserving migration is a computationally expensive operation when performed in an analytically exact manner. As disclosed in the Sun and Martinez publication, amplitude preserving weights can be approximated. However, such approximated weights using methods known in the art have proven to have accuracy limitations.

Generally, methods according to the invention include an approximation for the so-called "true amplitude" weights for the above Kirchhoff time migration equation in v(z) (velocity being related to depth) media by estimating the geometrical spreading terms using a constant-velocity approximation, and using takeoff and emergence angles computed accurately using a velocity model that varies with travel time, on the fly. By accurately computing takeoff and emergence angles, the estimated weights can be used to produce more accurate images than by simply using a constant velocity approximation for both weight calculation and takeoff and emergence angle calculation. Computing the weights on the fly reduces the high demand of CPU time and large storage requirements, and thus makes the method very efficient.

The theory of methods according to the invention can be explained as follows. As explained in the Zhang et al. publication, cited in the Background section herein, a "true amplitude" weight function (as used in the Kirchhoff migration equation (1)) in a v(z) medium (velocity being related to depth) with common offset geometry is given by the expression:

$$w = \frac{\sqrt{\cos\alpha_{s0}\cos\alpha_{r0}}}{v_0} \left[ \frac{\left(\sqrt{\frac{\psi_s}{\psi_r}} + \sqrt{\frac{\psi_r}{\psi_s}}\right)}{\left(\sqrt{\frac{\sigma_s}{\sigma_r}} + \sqrt{\frac{\sigma_r}{\sigma_s}}\right)} + \frac{\sin^2\gamma}{2\cos^2\theta} L \right] \quad (5)$$

Where γ is the angle between the projections of source and receiver rays to the Earth's surface, and L is given by the expression:

$$L = (\cos\alpha_s + \cos\alpha_r)\left(\sqrt{\frac{\psi_s\psi_r}{\sigma_s\sigma_r}} + \sqrt{\frac{\sigma_s\sigma_r}{\psi_s\psi_r}}\right) - \\ (1 + \cos\alpha_s\cos\alpha_r)\left(\sqrt{\frac{\psi_s\sigma_r}{\psi_r\sigma_s}} + \sqrt{\frac{\psi_r\sigma_s}{\psi_s\sigma_r}}\right) \quad (6)$$

In the above equations (5) and (6), $\alpha_s$ represents the angle along the seismic energy ray path from the seismic source relative to vertical, and $\psi_s$ and $\sigma_s$ are in-plane and out-of-plane geometric spreading terms from the seismic source position to the image point. Equivalent definitions for each seismic receiver position apply for $\alpha_r$, $\psi_r$ and $\sigma_r$. Even if the last term in equation (5), $L \sin^2 \gamma/(2 \cos^2 \theta)$ is neglected (which it may be because it is frequently insignificant in magnitude), it is still computationally expensive to include both in-plane and out-of-plane spreading terms in equation (6) in the form shown above. The computational expense arises because the in-plane and out-of-plane spreading terms must be calculated in advance and stored in table form (involving costly transitory or permanent computer storage) and be interpolated during migration.

For a constant velocity medium, having a velocity represented by $v_0$, however, the amplitude weight function can be simplified to the following expression:

$$w = \frac{t_m}{2v_0}\left(\frac{t_s}{t_r} + \frac{t_r}{t_s}\right)\left(\frac{1}{t_r} + \frac{1}{t_s}\right) \quad (7)$$

In the foregoing expression, $t_m$ is the two-way image time, and $t_s$ and $t_r$ are, respectively the travel times from source position to the image point and from image point to receiver position Using the constant velocity amplitude weight function calculated as shown above in equation (7), however, the weight factor is typically underestimated, mainly because the takeoff angle, $\alpha_{s0}$, at the source, and the emergence angle, $\alpha_{r0}$, at the receiver, are overestimated due to an assumed straight ray path. A straight ray path is what is assumed when the media are assumed to have constant velocity.

In order to improve the accuracy of migration results when using such approximated weights, in a method according to the invention, the takeoff and the emergence angles are computed accurately, using equations (9) and (10) as will be explained below, for a velocity model that varies with time or depth. Then a constant velocity approximation can be used for computing the ratios of the spreading terms for equation (5). Finally, the last term in equation (5) can be neglected, because it typically is only very small in magnitude. With these approximations, an amplitude weight function can be expressed as:

$$w = \frac{\sqrt{\cos\alpha_{s0}\cos\alpha_{r0}}}{v_0} \sqrt{t_s t_r}\left(\frac{t_s}{t_r} + \frac{t_r}{t_s}\right)\left(\frac{1}{t_r} + \frac{1}{t_s}\right) \quad (8)$$

Because the velocity is assumed to be independent of the radial (lateral or surface position) coordinate, the radial component of the slowness vector is conserved (Snell's law) for a v(z) medium. Therefore, the cosine of the takeoff angle for the source position can be computed accurately by the following equation:

$$\cos\alpha_{s0} = \sqrt{1 - \left(\frac{\partial t_s}{\partial \rho_s}\right)^2 v_0^2} \quad (9)$$

Similarly, the cosine of the emergence angle can be computed by the expression:

$$\cos\alpha_{r0} = \sqrt{1 - \left(\frac{\partial t_r}{\partial \rho_r}\right)^2 v_0^2} \quad (10)$$

In the foregoing equation (9), $t_s$ is the travel time from the source position to the image point, $\rho_s$ is the coordinate in the radial direction from the source in a v(z) medium, and $v_0$ is the velocity at the surface. Corresponding terms for the image point to the receiver (r) position are in equation (10). Because the travel time is computed analytically, the derivatives in equations (9) and (10) are computed analytically also. It is apparent that the weight function of equation (8) is more computationally expensive to perform than that of equation (7), but the results obtained can be substantially better than those obtained using the constant velocity approximation of equation (7).

Having calculated a weight function, total travel times can be calculated, for example, using an expression such as equation (2) for bending rays in VTI media. Then, the travel times and weight functions may be used to generate images using the Kirchhoff time migration equation (1).

One embodiment of a method according to the invention is shown in a flow chart in FIG. 1. At 10, a model is generated of seismic velocity with respect to two-way travel time of seismic energy. The model generated at 10 is used, At 12, weights can be estimated using a constant velocity approximation. At 14, the takeoff and emergence angles are calculated using the formula. At 16, the weights and takeoff and emergence angles are used to generate the migrated image (meaning that input seismic data samples are mapped to image samples according to equation (1).

Figure 5:
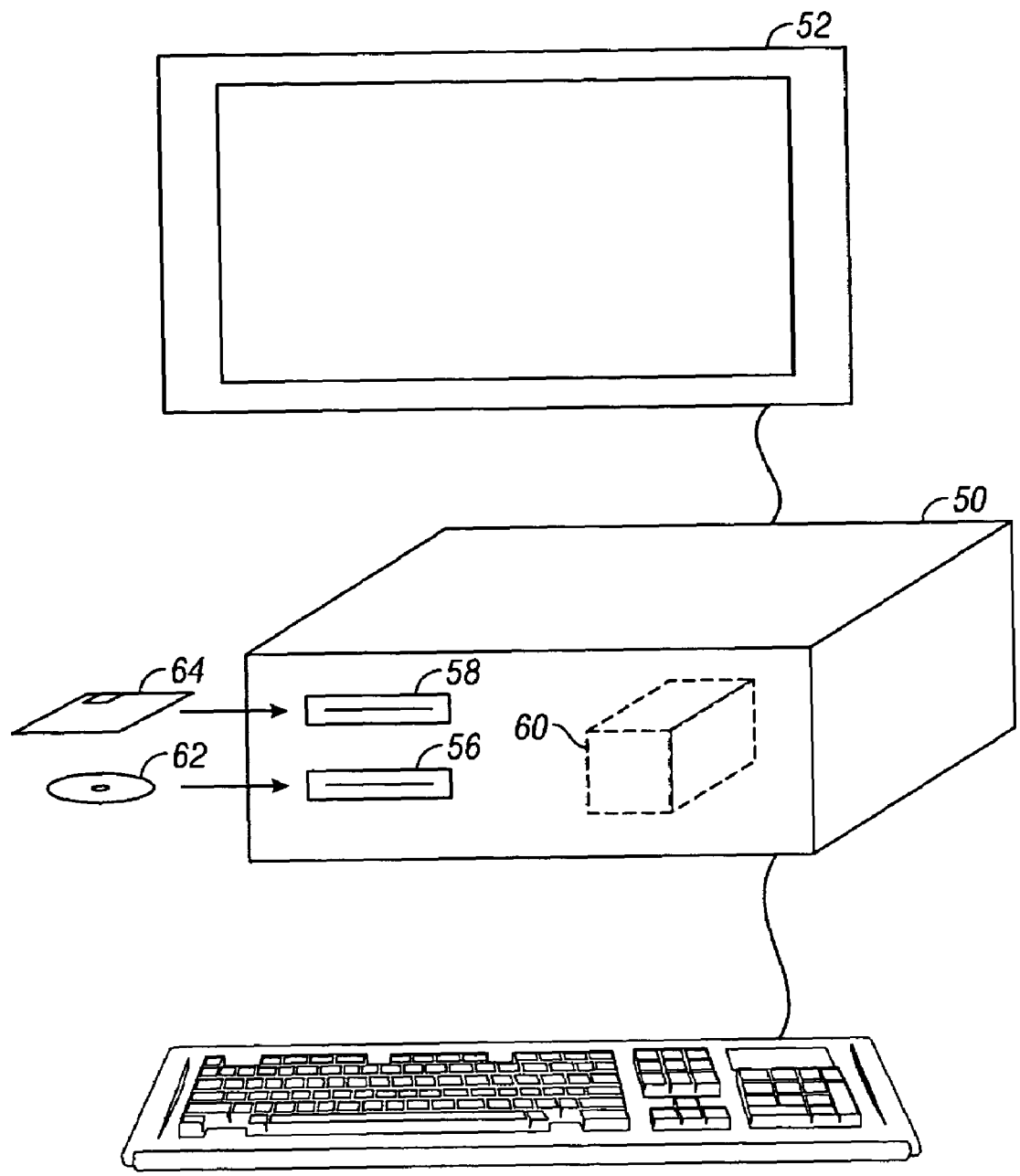
FIG. 5 shows a programmable computer and a computer readable medium having a program stored thereon.

In another aspect, the invention relates to computer programs stored in computer readable media. Referring to FIG. 5, the foregoing process as explained with reference to FIG. 1, can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute acts as set forth above and explained with respect to FIG. 1.

Figure 2:
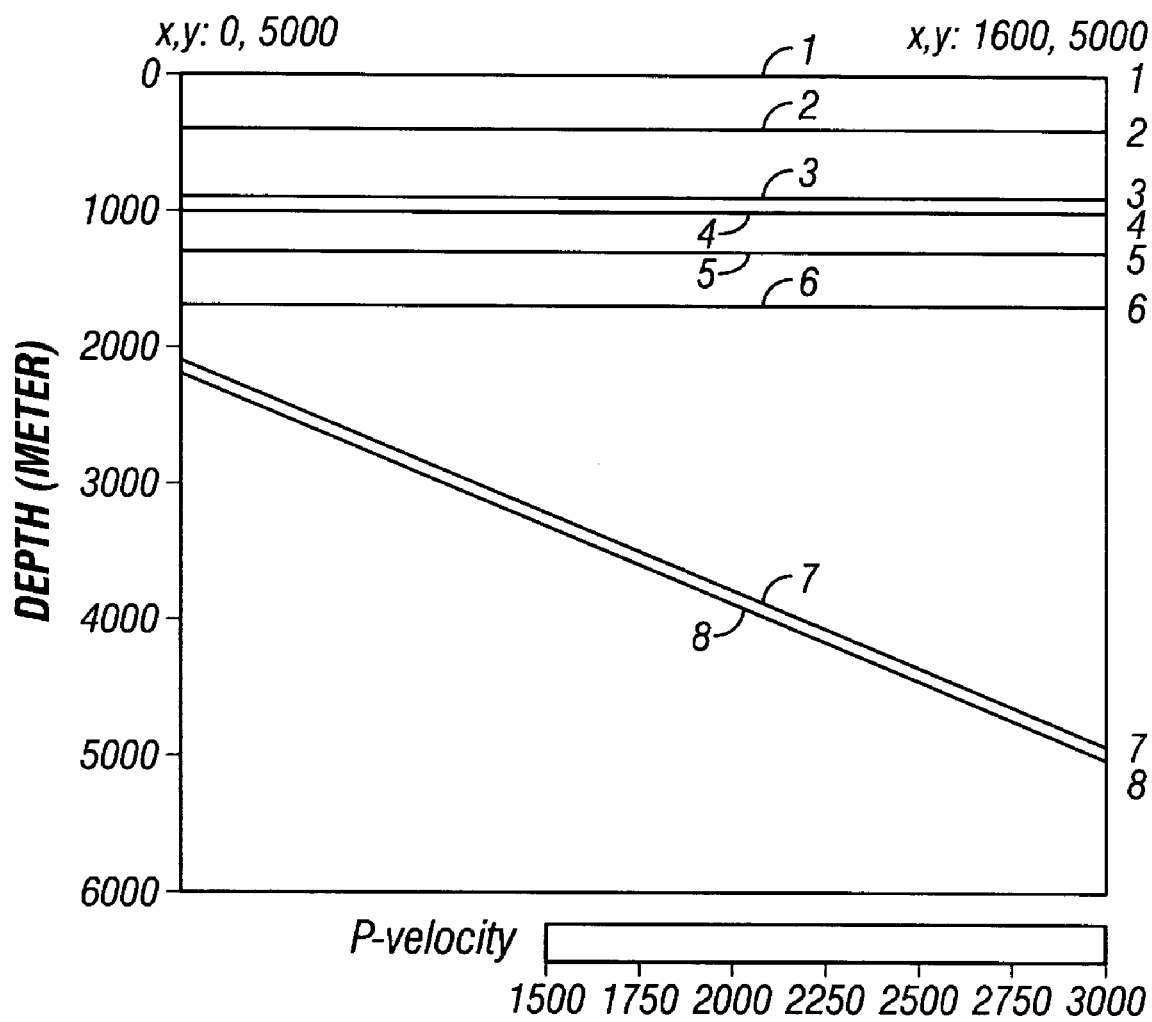
FIG. 2 shows an example Earth model used to simulate a migration process.

A three dimensional synthetic model, representing two, brine-filled sand layers embedded in shale, was used to test the foregoing embodiment. A graphic representation of the model along one plane is shown in FIG. 2. A water layer is represented as being between layer boundaries indicated by reference numerals 1 and 2. Shale layers having various velocities are shown disposed between boundaries 2 and 3, 4 and 5, 5 and 6, and 6 and 7. Each shale layer is modeled as having a different velocity so as to provide a seismic reflector at each such boundary. Another shale layer is shown below boundary 8, however the model does not provide any reflector below boundary 8. A topmost one of the two sand layers is shown disposed between boundaries indicated by numerals 3 and 4. The topmost sand layer is "flat" (meaning that the structural dip is zero), The lower, dipping sand layer, indicated between boundaries labeled 7, 8, and is modeled as having a 10 degree dip. The model has 25×12.5 meter bin spacing. A dual source vessel used in the modeling has 8 streamers separated by 100 meters. Each streamer has 313 receivers with group interval of 25 m and offset range between 200 m and 8000 m.

Figure 3:
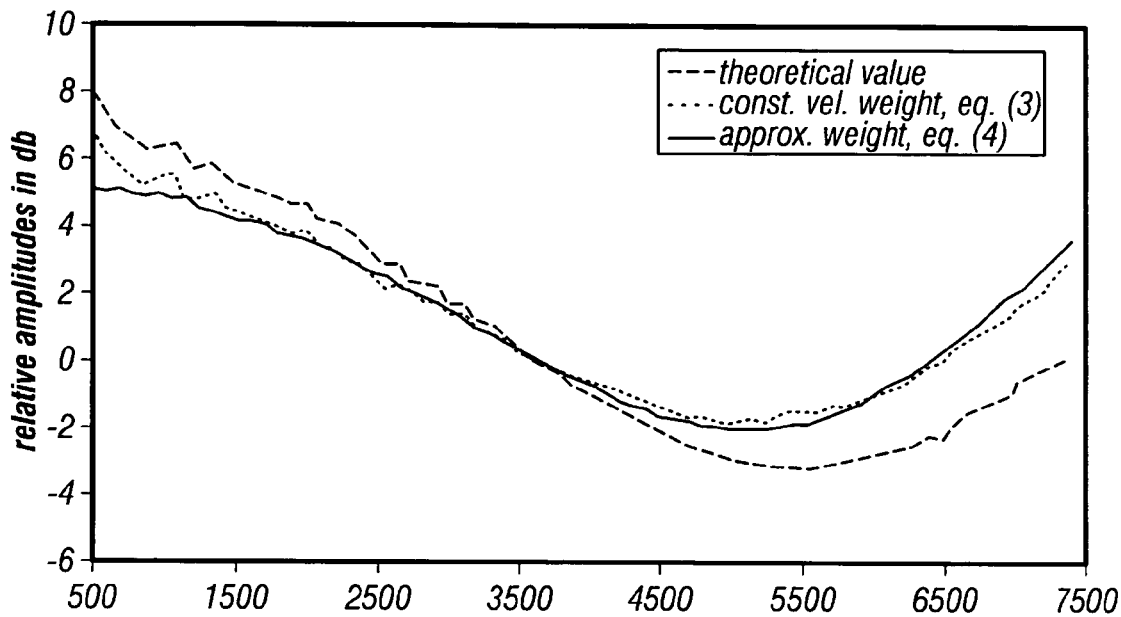
FIGS. 3 and 4 show amplitude versus offset ("AVO") analysis from migration using analytically exact weights and estimated weights according to the invention.
Figure 4:
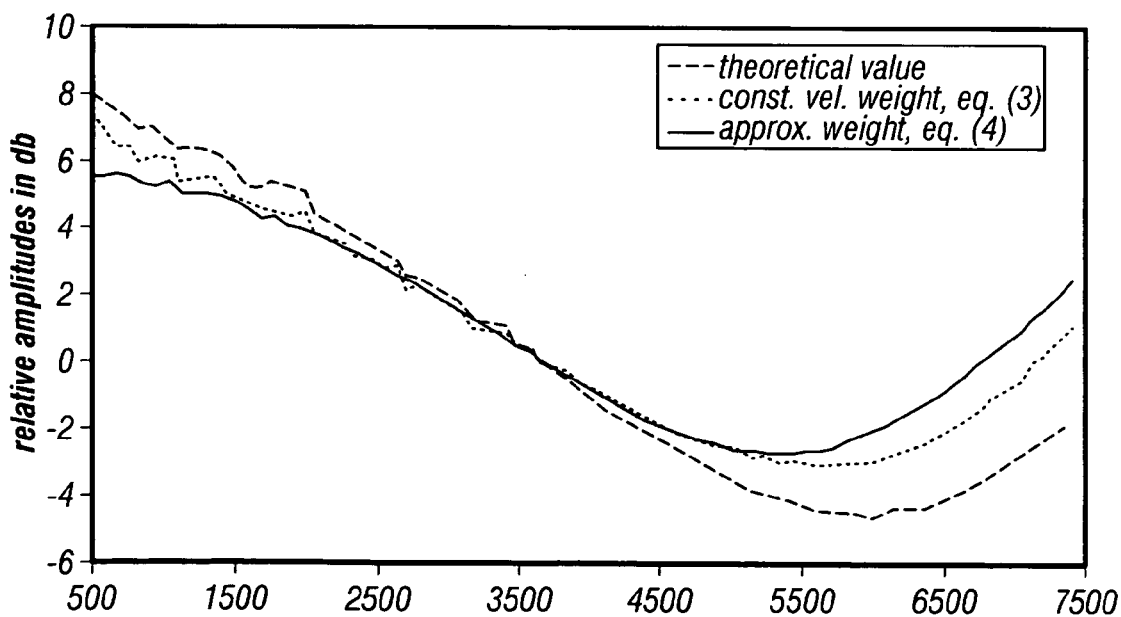

A common image gather, consisting of 100 m to 8000 m offset ranges with an offset increment of 100 m was migrated using amplitude preserving Kirchhoff time migration as explained above. The migration was preformed using a prior art weight function approximation method, an analytically exact weight function method, and the embodiment of the method of computing weights according to the invention as explained above. Amplitude versus offset ("AVO") analysis was then performed on the top (boundary 7) and the bottom (boundary 8) of the dipping sand layer. The results, shown respectively in FIGS. 3 and 4, show that the amplitude weight function in equation (8) improves the amplitude accuracy significantly as compared with the weight in prior art approximation equation (7), especially at far offsets. In FIGS. 3 and 4, the AVO analysis from migration using analytically exact weights is shown by curve 20. AVO analysis of migrated seismic data using prior art weight approximation is shown at curve 22. Finally, AVO analysis of migrated seismic data using the method of the invention for calculating weights is shown at curve 24.

Methods and computer programs according to the invention can provide accurate weight factors for amplitude preserving Kirchhoff prestack time migration at less computational cost than precise, deterministic methods for calculating weights.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for amplitude preserving Kirchhoff time migration, comprising:

calculating, for at least one image point, estimates of geometrical spreading terms using a constant velocity approximation;

calculating, for the at least one image point, takeoff and emergence angles using a model of velocity which varies with respect to at least one of migrated time and depth;

estimating, for the at least one image point, a value of a weight function from the estimated geometrical spreading terms and calculated takeoff and emergence angles; and storing the estimated value of the weight function in a computer readable medium.

2. The method of claim 1 further comprising generating an image at at least one sample time using the estimated weight function values.

3. The method of claim 2 wherein the generating an image comprises calculating travel times to at least one image point for a plurality of seismic source and seismic receiver positions, and calculating a Kirchhoff boundary integral based on the travel times and the weight function values.

4. A computer program stored in a computer readable medium, the program having logic operable to cause a programmable computer to perform steps comprising:

calculating, for at least one image point, estimates of geometrical spreading terms for amplitude preserving Kirchhoff time migration using a constant velocity approximation;

calculating, for at least one image point takeoff and emergence angles using a model of velocity which varies with respect to at least one of migrated time and depth; and estimating, for the at least one image point, a value of a weight function from the estimated geometrical spreading terms and calculated takeoff and emergence angles.

5. The program of claim 4 further comprising logic operable to cause the computer to perform generating an image at at least one sample time using the estimated weight function values.

6. The program of claim of claim 5 wherein the generating an image comprises calculating travel times to at least one image point for a plurality of seismic source and seismic receiver positions, and calculating a Kirchhoff boundary integral based on the travel times and the weight function values.

7. A method for amplitude preserving Kirchhoff time migration, comprising:

calculating, for at least one image point, estimates of geometrical spreading terms using a constant velocity approximation;

calculating, for the at least one image point, takeoff and emergence angles using a model of velocity which varies with respect to at least one of migrated time and depth;

estimating, for the at least one image point, a value of a weight function from the estimated geometrical spreading terms and calculated takeoff and emergence angles;

generating an image at at least one sample time using the estimated weight function values; and displaying the image.

8. The method of claim 7 wherein the generating an image comprises calculating travel times to at least one image point for a plurality of seismic source and seismic receiver positions, and calculating a Kirchhoff boundary integral based on the travel times and the weight function values.

9. A method for amplitude preserving Kirchhoff time migration processing of seismic data, comprising:

accessing recorded signals, the signals corresponding to measured seismic amplitude with respect to time of actuation of a seismic energy source recorded at a plurality of geodetic source and receiver positions proximate a top of an area of the Earth's subsurface to be surveyed;

calculating, for at least one subsurface point in the area, estimates of geometrical spreading terms for each of the accessed signals using a constant velocity approximation;

calculating, for the at least one image point, takeoff and emergence angles using a model of velocity which varies with respect to at least one of migrated time and depth for each of the accessed signals;

estimating, for the at least one image point, values of a weight function from the estimated geometrical spreading terms and calculated takeoff and emergence angles.

10. The method of claim 9 further comprising generating an image at at least one sample time using the estimated weight function values.

11. The method of claim 10 wherein the generating an image comprises calculating a Kirchhoff boundary integral based on the weight function values.

* * * * *